United States Patent
Vaidya et al.

(10) Patent No.: US 11,006,337 B2
(45) Date of Patent: May 11, 2021

(54) HANDOFF MANAGEMENT IN A WIRELESS NETWORK ENVIRONMENT

(71) Applicant: Charter Communications Operating, LLC, St. Louis, MO (US)

(72) Inventors: Maulik V. Vaidya, Palmdale, CA (US); Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/399,072

(22) Filed: Apr. 30, 2019

(65) Prior Publication Data

US 2020/0351739 A1    Nov. 5, 2020

(51) Int. Cl.
*H04W 36/08* (2009.01)
*H04W 36/36* (2009.01)
*H04W 36/26* (2009.01)
*H04W 36/00* (2009.01)

(52) U.S. Cl.
CPC ..... *H04W 36/08* (2013.01); *H04W 36/00835* (2018.08); *H04W 36/26* (2013.01); *H04W 36/36* (2013.01)

(58) Field of Classification Search
CPC .............. H04W 36/36; H04W 36/08; H04W 36/00835; H04W 36/26
See application file for complete search history.

(56) References Cited

U.S. PATENT DOCUMENTS

| | | | |
|---|---|---|---|
| 2006/0246906 A1* | 11/2006 | Vaittinen | H04W 36/14 455/442 |
| 2009/0052401 A1* | 2/2009 | Nakajima | H04W 36/18 370/331 |
| 2016/0037406 A1* | 2/2016 | Centonza | H04W 36/08 370/332 |
| 2016/0198466 A1* | 7/2016 | Yang | H04L 67/12 370/331 |
| 2017/0055189 A1* | 2/2017 | Xu | H04W 72/14 |
| 2018/0279193 A1* | 9/2018 | Park | H04W 76/27 |
| 2020/0029251 A1* | 1/2020 | Wu | H04W 36/0083 |

(Continued)

OTHER PUBLICATIONS

36PP TSG-Ran WG2 #105bis , Xian China, Apr. 8-12, 2019, pp. 4-5.

*Primary Examiner* — Benjamin H Elliott, IV
(74) *Attorney, Agent, or Firm* — Armis IP Law, LLC

(57) ABSTRACT

According to one configuration, a system includes user equipment in communication with a wireless base station. The user equipment receives a notification from a first wireless access point of multiple wireless access points. The notification indicates a set of candidate wireless access points in the wireless network environment in which to selectively perform a handoff from a first wireless access point. The user equipment monitors for occurrence of a trigger condition. In response to detecting a trigger condition, the user equipment identifies (such as selects) a second wireless access point (from the set of candidate wireless access points) in which to perform the handoff. Via communications from the user equipment to the second wireless access point, the user equipment initiates the handoff. The user equipment notifies the first wireless access point of the attempted and/or failed attempt of the handoff to the second wireless access point.

34 Claims, 10 Drawing Sheets

(56) References Cited

U.S. PATENT DOCUMENTS

2020/0068448 A1\* 2/2020 Byun ................. H04W 36/023
2020/0084683 A1\* 3/2020 Moosavi ............... H04W 36/24
2020/0154326 A1\* 5/2020 Deenoo ................ H04W 74/02

\* cited by examiner

HANDOFF MANAGEMENT IN A WIRELESS NETWORK ENVIRONMENT

BACKGROUND

Conventional wireless networks provide connectivity of mobile communication devices to the Internet via respective wireless access points (based on wireless protocols such as WiFi™, LTE, NR, etc.).

For example, assume that a mobile communication device establishes a respective wireless communication link with a first wireless access point. Via communications over the respective wireless communication link, the mobile communication device is able to send/receive data over the Internet.

In many instances, a respective mobile communication device moves from one location to another in a respective wireless network environment. In such an instance, the mobile communication device may move out of wireless communication range with respect to the first wireless access point, requiring a respective handoff of the wireless communication link to a second wireless access point in the wireless network environment that is able to provide the user equipment better connectivity to the remote network such as the Internet.

In general, conventional wireless handoffs require the source cell (current wireless access point to which the mobile communication device is connected) to prepare the target mobile communication device for the handoff, initiate the handoff of the mobile communication device from the first wireless access point to the second wireless access point, and complete the respective user equipment handoff by redirecting uplinks/downlinks associated with the wireless communication link, and forwarding any buffered communications so that the second wireless access point receiving the handoff is able to provide the user equipment continued access to the remote network such as the Internet.

BRIEF DESCRIPTION OF EMBODIMENTS

There are deficiencies associated with conventional techniques of handing off mobile communication devices (a.k.a., user equipment) in a wireless network environment. For example, conventional wireless systems require the source wireless access point (such as a wireless access point from which the user equipment is being handed off) to notify the user equipment of a particular wireless access point that will receive the wireless handoff. Such techniques are limiting because the wireless access point initiating the handoff must; i) prepare the target mobile communication device for the handoff, ii) execute the handoff, and iii) redirect uplink/downlink, and forward any buffered communications.

Embodiments herein support improved wireless handoffs in a wireless network environment.

More specifically, a wireless network environment according to embodiments herein includes user equipment and multiple wireless access points. The user equipment receives a notification from a first wireless access point in the wireless network environment. The notification indicates a set of multiple candidate wireless access points in the wireless network environment in which to selectively perform a handoff from a first wireless access point. The user equipment monitors for occurrence of one or more trigger conditions. In response to detecting a trigger condition, the user equipment identifies (such as selects) a second wireless access point (from the set of multiple candidate wireless access points) in which to perform the handoff. Via communications from the user equipment to the second wireless access point, the user equipment initiates the handoff of the user equipment to the second wireless access point. As further discussed herein, the user equipment further notifies the first wireless access point of the attempted and/or failed attempt of the handoff to the second wireless access point.

Accordingly, embodiments herein include user equipment operable to: i) receive notification of multiple candidate wireless access points; ii) monitor for occurrence of one or more trigger conditions; and iii) based on a trigger condition, initiate selection of a corresponding wireless access point in which to perform a respective handoff.

In accordance with further embodiments, the first wireless access point generates one or more trigger conditions associated with a respective handoff. In one embodiment, the notification from the first wireless access point to the user equipment further specifies the one or more trigger conditions to be monitored by the user equipment. As previously discussed, in response to occurrence of a respective trigger condition, the user equipment initiates a respective handoff to a selected candidate wireless access point from the set.

In accordance with yet further embodiments, the first wireless access point (a.k.a., source cell) can be configured to provide the user equipment access to a remote network such as the Internet. To learn of current operating conditions associated with the user equipment and the wireless network environment, in one embodiment, the first wireless access point notifies the user equipment to monitor the availability/attributes of multiple other candidate wireless access points in the wireless network environment.

Based on a report from the user equipment indicating current operating conditions of the wireless network environment, the first wireless access point may detect a degradation of a respective wireless communication link between the first wireless access point and the user equipment and that a handoff from the first wireless access point to another wireless access point in the wireless network may be beneficial. In such an instance, based on the report, the first wireless access point generates a set of multiple candidate wireless access points in which the user equipment is able to selectively perform a handoff.

As previously discussed, the first wireless access point can be configured to notify the user equipment of trigger conditions in which the user equipment is to perform a respective handoff. Thus, prior to receiving the notification of a set of candidate wireless access points at the user equipment from the first wireless access point: i) the user equipment can be configured to monitor for presence of wireless access points other than the first wireless access point in the wireless network environment; and ii) communicate a report from the user equipment to the first wireless access point, the report including performance information associated with a group of wireless access points detected as being in wireless communication range of the user equipment.

In accordance with further embodiments, the first wireless access point (or corresponding communication management resource associated with the first wireless access point) selects identities of the candidate wireless access points included in the notification communicated to the user equipment. In one embodiment, the first wireless access point selects the identities of candidate wireless access points from the group of wireless access points in the report received from the user equipment.

Yet further embodiments herein include, in response to completing a handoff of the user equipment from the first wireless access point to the second wireless access point, the second wireless access point (receiving the handoff of the user equipment and corresponding wireless communication link) communicates a message (indicating the completion of the handoff) from the second wireless access point to the first wireless access point.

In still further embodiments, in response to detecting the trigger condition resulting in the attempted handoff by the user equipment to the selected second wireless access point, the user equipment can be configured to communicate a message to the first wireless access point indicating the attempted handoff of the user equipment from the first wireless access point to the second wireless access point. For example, the message indicating initiation of the attempted handoff by the user equipment from the first wireless access point to the second wireless access point is a best efforts type of message (such as sent without need of an acknowledgement by the first wireless access point), which may or may not be received by the first wireless access point due to degradation of the current wireless communication link between the user equipment and the first wireless access point.

Note that the user equipment-generated best efforts message (such as one shot message) indicating the attempted handoff by the user equipment can include any suitable type of information. For example, in one embodiment, the message generated by the user equipment includes: i) first data (such as one or more bits of data) indicating the initiation of the handoff by the user equipment, ii) second data indicating an identity of the user equipment initiating the handoff, and iii) third data indicating an identity of the second wireless access point. Accordingly, the first wireless access point (source cell) is made aware of the attempted handoff as well as an identity of the user equipment initiating the handoff and an identity of a respective wireless access point receiving the handed off wireless communication link.

Further embodiments herein include establishing/allocating a communication (control) channel between the user equipment and the first wireless access point prior to user equipment detecting the trigger condition. In one embodiment, the control/communication channel/resource is allocated in case a trigger condition occurs so that the user equipment (via the one-shot message) is able to notify the first wireless access point of the handoff via a respective communication transmitted over the control channel. Thus, in one embodiment, the control/communication channel is allocated for conveyance of communications from the user equipment to the first wireless access point in anticipation of possible handoff as decided by the user equipment.

The first wireless access point can be configured to perform any suitable functions in response to receiving the notification of the attempt by the user equipment to be handed off to a second wireless access point. For example, in one embodiment, the first wireless access point may not perform any function as a result of receiving the handoff notification message. Alternatively, the first wireless access point can be configured to instruct one or more other wireless access points (such as candidate wireless access points not selected for the handoff) in the set to revoke any resources reserved for a possible handoff associated with the user equipment.

Accordingly, embodiments herein can include: establishing a control/communication channel between the user equipment and the first wireless access point prior to detecting the trigger condition, the control channel established in anticipation of the handoff of the user equipment from the first wireless access point to a wireless access point in the set; and communicating a first message from the user equipment to the first wireless access point, the first message indicating initiation of the handoff by the user equipment from the first wireless access point to the second wireless access point.

In accordance with further embodiments, if the attempted handoff of the user equipment to the second wireless access point fails, the user equipment can be configured to send a second message from the user equipment to the first wireless access point, the second message indicating a failure of the handoff of the user equipment from the first wireless access point to the second wireless access point. Thus, a first message from the user equipment to the first wireless access point may indicate the attempted handoff; the second message from the user equipment to the first wireless access point may indicate the failed attempt.

Further embodiments herein include initially establishing a wireless communication link between a first wireless access point and user equipment in a wireless network environment. In a similar manner as previously discussed, a communication management resource associated with the first wireless access point selects a set (pool, list, etc.) of candidate wireless access points to receive a conditional handoff of the wireless communication link from the first wireless access point. The first wireless access point provides notification of the conditional handoff to each of the multiple wireless access points in the set. Additionally, the first wireless access point further notifies the user equipment of the set of candidate wireless access points, enabling the user equipment to select an appropriate wireless access point to receive the conditional handoff. The first wireless access point receives a communication from the user equipment, the communication indicating initiation (attempt) by the user equipment of the conditional handoff of the wireless communication link from the first wireless access point to a second wireless access point selected by the user equipment form the set.

In yet further embodiments, as previously discussed, the first wireless access point can be configured to provide notification of one or more trigger conditions, occurrence of which causes the user equipment to initiate execution of the conditional handoff of the wireless communication link from the first wireless access point to a corresponding wireless access point selected by the user equipment from the set.

Yet further embodiments herein include the first wireless access point receiving one or more communications from the user equipment indicating the attempt or failed attempt by the user equipment to handoff to the second wireless access point.

Embodiments herein are useful over conventional techniques. For example, the user equipment makes a decision regarding whether to perform a handoff, reducing involvement of a current (first) wireless access point from which the handoff occurs. This is significant because, in many instances, a handoff is performed from a current wireless access point to a new wireless access point as a result of a poor wireless connection between the user equipment and current wireless access point. Such a poor connection (less reliable communications) is not conducive for the current wireless access point to facilitate and/or manage the respective handoff between the user equipment and another wireless access point. Additionally, allocation of a (temporary) control/communication channel to the user equipment and communication of a corresponding best efforts communication from the user equipment to the current wireless access point over the allocated control/communication channel potentially provides notice to the current wireless access point of the handoff initiated by the user equipment. The control channel also can be used to provide notification from the user equipment to the current wireless access point of any failed handoff attempts. Notification of the attempted handoff or failed handoff attempt prompts the first wireless access point to execute one or more communication management functions (such as wireless resource allocation, reservation, clean-up, reuse, reallocation, etc.). These and further embodiments are discussed below in more detail.

Note that any of the resources as discussed herein can include one or more computerized devices, wireless access points, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: receive a notification from a first wireless access point, the notification indicating a set (pool) of multiple candidate wireless access points in the wireless network environment in which to selectively perform a handoff from a first wireless access point; in response to detect a trigger condition at the user equipment, initiate a handoff of the user equipment from the first wireless access point to a second wireless access point; in furtherance of performing the handoff: i) identify a second wireless access point in which to perform the handoff, the second wireless access point selected from the set, and ii) via communications from the user equipment to the second wireless access point, initiate the handoff of the user equipment to the second wireless access point.

Another embodiment herein includes a computer readable storage medium and/or system having instructions stored thereon. The instructions, when executed by the computer processor hardware, cause the computer processor hardware (such as one or more co-located or disparately located processor devices or hardware) to: establish a wireless communication link between a first wireless access point and user equipment in a wireless network environment; select a set (pool) of candidate wireless access points, the set of wireless access points selected to receive a conditional handoff of the wireless communication link from the first wireless access point; via communications from the first wireless access point, provide notification of the conditional handoff to each of the multiple wireless access points in the set; notify the user equipment of the set of candidate wireless access points in the set; and facilitate a handoff of the user equipment from the first wireless access point to a candidate wireless access point selected by the user equipment from the set.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing dynamic data flow prioritization that varies depending on current network conditions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
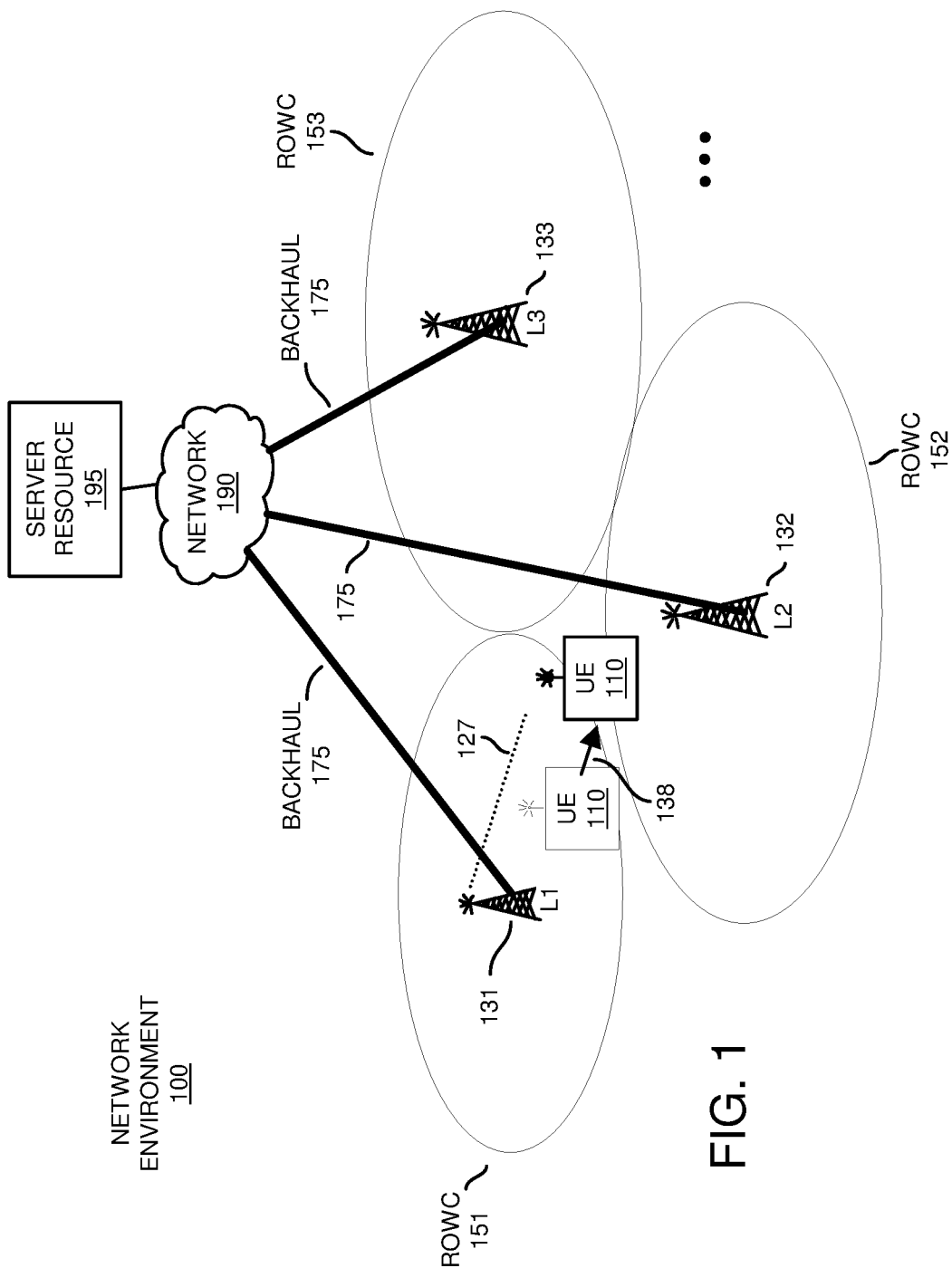
FIG. 1 is an example diagram illustrating operation of user equipment and handoff management operations in a wireless network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Embodiments herein include a wireless network environment including multiple wireless access points and user equipment. In one embodiment, the user equipment receives a notification from a first wireless access point amongst multiple wireless access points in the wireless network environment. The notification indicates a set of multiple candidate wireless access points in the wireless network environment in which the user equipment is to selectively perform a conditional handoff from the first wireless access point. The notification from the first wireless access point can further include trigger conditions to be monitored by the user equipment with respect to initiation of a respective handoff. In such an instance, the user equipment monitors for occurrence of one or more trigger conditions such as specified by the notification from the first wireless access point. In response to detecting the trigger condition, the user equipment identifies (such as selects) a second wireless access point (from the set of multiple candidate wireless access points) in which to perform the handoff.

Subsequent to selection, via communications from the user equipment to the second wireless access point, the user equipment initiates the handoff of the user equipment to the second wireless access point. Note again that further embodiments herein can include the user equipment providing notification of the attempted handoff (and potentially a failure of the handoff) to the first wireless access point. This provides notification to the first wireless access point of the user equipment initiating the handoff to the selected second wireless access point. These and further embodiments are discussed herein.

Now, with reference to the drawings, FIG. 1 is an example diagram illustrating a wireless network environment including user equipment and multiple wireless base stations according to embodiments herein.

As shown, wireless network environment 100 includes wireless access point 131, wireless access point 132, wireless access point 133, etc., user equipment 110 (such as a mobile communication device operated by a respective user), network 190, and server resource 195.

Note that each of the wireless access points in wireless network environment 100 includes a communication management resource (such as hardware, executed software instructions, and/or a hybrid of both) supporting communications with one or more mobile communication devices (such as different instances of user equipment) in the network environment 100. User equipment 110 (mobile communication device) also includes a communication management resource (such as hardware, executed software instructions, and/or a hybrid of both) facilitating communications with respective wireless access points.

Note that the wireless access points can be configured to support wireless communications in accordance with any suitable wireless protocol. For example, in one embodiment, the wireless access points support LTE (Long Term Evolution) communications, NR (New Radio) communications, 3G, 4G, 5G, etc.

Via communications over wireless communication link 127 as well as backhaul link 175 between the wireless access point 131 and the network 190, the user equipment 110 is able to access (such as retrieve data from) one or more server resources (such as server resource 195) in network 190. In a reverse direction, the server resources in network 190 communicate data over backhaul 175 and a respective wireless communication link 127 to the user equipment 110.

As further shown in this example embodiment, each of the wireless access points in wireless network environment 100 provides limited wireless coverage in wireless network environment 100. For example, the wireless access point 131 at location L1 supports wireless communications to any user equipment (mobile communication devices) present in region of wireless coverage 151; the wireless access point 132 at location L2 supports wireless communications to any user equipment (mobile communication devices) present in region of wireless coverage 152; the wireless access point 133 at location L3 supports wireless communications to any user equipment (mobile communication devices) present in region of wireless coverage 153; and so on.

Assume in this example embodiment that the user equipment 110 in wireless communication with the wireless access point 131 via wireless communication link 127 moves in a direction 138 away from the wireless access point 131. In such an instance, the user equipment 110 and/or wireless access point 131 detects degradation of wireless parameters (such as wireless communication signal strength, lost data packets, transmission errors, etc.). To provide continued wireless communication service such as access to server resource 195 via backhaul 175, embodiments herein include initiating execution of a conditional handoff of the user equipment 110 and corresponding wireless communication link 127 to another wireless access point in the wireless network environment 100 that provides the user equipment 110 access to the network 190 and corresponding server resources.

Figure 2:
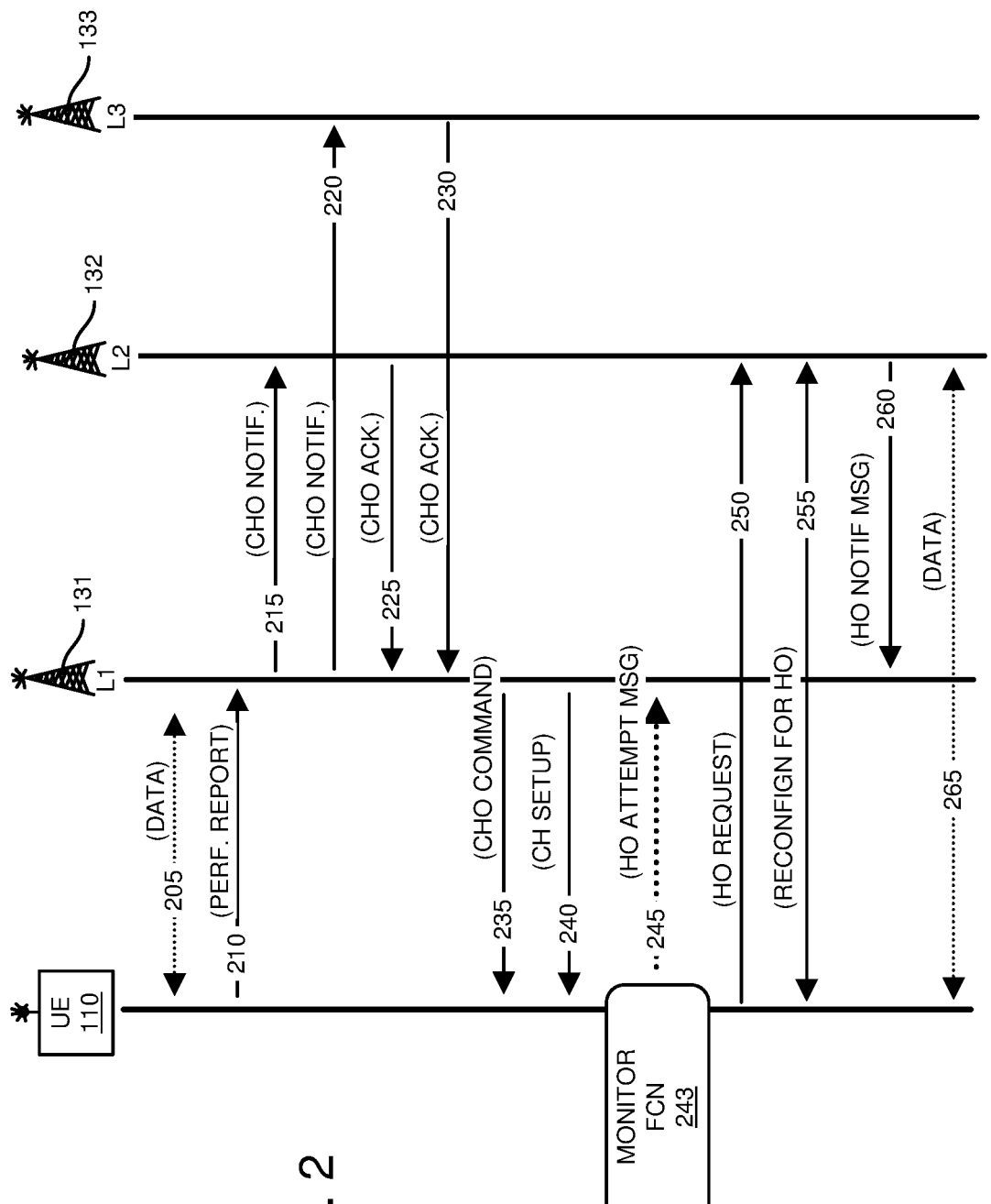
FIG. 2 is an example diagram illustrating handoff control flow according to embodiments herein.

FIG. 2 is an example diagram illustrating handoff control flow according to embodiments herein.

Further embodiments herein include initially establishing a wireless communication link 127 between first wireless access point 131 and user equipment 131 in the wireless network environment 100. Via the wireless communication link 127, the first wireless access point 131 (source cell or current cell station) provides the user equipment 110 data access through backhaul 175 to a remote network 190 such as the Internet.

In one embodiment, to learn of current operating conditions associated with the user equipment 110 and the wireless network environment 100, the first wireless access point 131 can be configured to communicate a command (message) to the user equipment 110. Such a message notifies the user equipment 110 to monitor the availability of multiple other candidate wireless access points and provide corresponding feedback to the wireless access point 131 region same.

In such an instance, in response to receiving the command, the user equipment monitors presence of one or more wireless access points in wireless network environment and collects information about each of them. For example, the user equipment 110 can be configured to monitor a power level of communications received from each of the other wireless access points (such as wireless access point 132, 133, 134, etc.). In one embodiment, the user equipment 110 generates a respective report indicating an ability of the user equipment 110 to receive communications from the wireless access points.

As further shown, via communications 210, the user equipment 110 communicates a respective report of the wireless access points (such as wireless access point 131, 132, 133, etc.) and corresponding network conditions (from a perspective of the user equipment 110) to the first wireless access point 131.

Based on the report from the user equipment 110 indicating current operating conditions of the wireless network environment 100 and corresponding wireless access points, the first wireless access 131 selects amongst the available wireless access points (as specified by the communications 210) to identify candidate wireless access points in which to potentially perform a handoff of the user equipment 110 and wireless communication link 127.

In one embodiment, the first wireless access point 131 (communication management resource) generates a set (such as list, pool, etc.) of multiple candidate wireless access points in which the user equipment 110 is able to selectively perform a handoff.

In one embodiment, the first wireless access point 131 (and/or user equipment 110) may detect a substrate degradation of a respective wireless communication link 127 between the first wireless access point 131 and the user equipment 110, and that a handoff from the first wireless access point 131 to another wireless access point in the wireless network environment 100 may be beneficial. For example, the first wireless access point 131 or user equipment 110 may detect movement of the user equipment 110 in direction 138 and that a handoff of the user equipment 110 and wireless communication link 127 to the wireless access point 132, 133, etc., may be needed to provide continued connectivity of the user equipment 110 and corresponding user to the network 190.

In one embodiment, assume that the communication management resource associated with the first wireless access point 131 selects the set of candidate wireless access points based on the report (performance information) received at the first wireless access point 131 from the user equipment 110. As previously discussed, the performance information in the report from the user equipment 110 indicates an ability of the user equipment to receive wireless communications from the different possible candidate wireless access points.

Note that the performance information received by the first wireless access point 131 to determine candidate wireless access points can be received from any suitable resource. For example, the first wireless access point 131 can receive communication performance information from each of the wireless access points or other monitor resources in wireless network environment 100.

In one embodiment, based on the received performance information from one or more resources in the wireless network environment 100, the wireless access point 131 produces a list of candidate wireless access points in the wireless network environment 100 that are best suited to receive a handoff of the user equipment 110 and wireless communication link 127 from the first wireless access point 131. In this example embodiment, assume that the first wireless access point (or corresponding communication management resource) selects the wireless access point 132 and wireless access point 133 as good candidates to receive the handoff of the user equipment 110 and corresponding wireless communication link 127. The wireless access point 131 does not include less desirable wireless access points in the set.

Assume that the performance (ability to communicate data over wireless communication link 127) substantially degrades over time. In such an instance, the first wireless access point 131 makes a decision to handoff of the user equipment 110 if certain trigger conditions occur.

In anticipation of a possible handoff, the wireless access point 131 provides notification of the conditional handoff associated with the user equipment 110 to each of the candidate wireless access points 132, 133, etc., that have been selected as a good candidate to accept the handoff.

In one embodiment, the notification from the wireless access point 131 to the wireless access points 132, 133, etc., includes: i) via communications 215, transmission of a first communication from the first wireless access point 131 to the second wireless access point 132; the first communication prompts the second wireless access point 132 to reserve wireless resources for the conditional handoff if it occurs, and ii) via communications 220, transmission of a second communication from the first wireless access point 131 to the third wireless access point 133; the second communication prompts the third wireless access point 133 to reserve wireless resources for the conditional handoff if it occurs.

Via communications 225, the wireless access point 132 acknowledges receipt of the conditional handoff notification from the wireless access point 131. Via communications 230, the wireless access point 133 acknowledges receipt of the conditional handoff notification from the wireless access point 133.

Via communications 235 (such as including a conditional handoff command and corresponding information), the user equipment 110 receives notification from first wireless access point 131 of the conditional handoff command and possible handoff to candidate wireless access points 132, 133, etc. In one embodiment, the notification indicates the set of multiple candidate wireless access points (such as wireless access points 132, 133, etc.) in the wireless network environment 100 in which the user equipment 110 is to selectively perform a handoff from the first wireless access point 131.

In accordance with further embodiments, in addition to specifying candidate wireless access points, the notification (such as communications 235) from the first wireless access point 131 to the user equipment 110 further specifies one or more trigger conditions (such as a timing of when to initiate a handoff, communication parameters and threshold values, etc.) to be monitored by the user equipment 110 to initiate the conditional handoff. As further discussed below, detection of a trigger condition or trigger conditions by the user equipment 110 causes the user equipment 110 to execute the conditional handoff.

In one embodiment, a trigger condition monitored by the user equipment 110 is the ability to receive wireless communications from the first wireless access point 131. In such an embodiment, the wireless access point 131 may provide minimal or maximum threshold value information to the user equipment 110. The user equipment 110 monitors attributes (such as a power level, bit error rate, etc.) associated with the wireless communications from the wireless access point 131 and initiates a respective handoff when the monitored parameter is above or below a respective threshold value. For example, the user equipment 110 may detect a trigger condition and initiate a handoff when the bit error rate of receiving communications from the wireless access point 131 is above a threshold value; the user equipment 110 may detect a trigger condition and initiate the handoff when the received power level of wireless communications from the wireless access point 131 is below a threshold value; and so on.

In response to detecting one or more trigger conditions as specified by the first wireless access point 131 or other suitable handoff management resource, the user equipment 110 initiates a handoff of the user equipment 110 and corresponding wireless communication link 127 to a wireless access point selected by the user equipment 110 from the set of candidate wireless access points specified in communications 235.

Further embodiments herein include establishing/reserving a temporary communication (control or uplink) channel between the user equipment 110 and the first wireless access point 131 prior to user equipment 110 detecting the trigger condition and initiating the handoff. In one embodiment, the control/communication channel is allocated in case a trigger condition occurs indicating to initiate the handoff. The pre-allocated wireless channel enables the user equipment 110 to notify the first wireless access point of the handoff (when it occurs) via respective communication transmitted over this pre-allocated channel. Thus, in one embodiment, the control/communication channel is allocated for conveyance of communications from the user equipment 110 to the first wireless access point 131 in anticipation of a possible handoff eventually initiated by the user equipment 110.

In response to receiving the conditional handoff command (as specified by the communications 235), the user equipment 110 executes the monitor function 243. In accordance with the monitor function 243, the user equipment 110 monitors for occurrence of one or more trigger conditions (such as that the performance of wireless communication link 127 and its ability to convey wireless communications between the user equipment 110 and wireless access point 131 falls below a threshold value).

In response to detecting the trigger condition (indicating a need to perform a respective handoff), assume in this example embodiment that the user equipment 110 identifies (such as selects) a second wireless access point 132 (from the set of multiple candidate wireless access points) in which to perform the handoff. In one embodiment, via communications 245 (such as a handoff attempt message) from the user equipment 110 to the second wireless access point 131 over the temporary pre-allocated control channel as previously discussed, the user equipment 110 notifies the first wireless access point 131 that the user equipment 110 plans to or has initiated the handoff of the user equipment 110 and wireless communication link 127 to the second wireless access point 132.

Accordingly, in response to detecting the trigger condition resulting in the attempted handoff, the user equipment 110 communicates a handoff attempt message (communications 245) to the first wireless access point 131 indicating the attempted handoff of the user equipment 110 from the first wireless access point 131 to the second wireless access point 132. In one embodiment, the handoff attempt message communicated to the first wireless access point 131 is a best efforts type of message, which may or may not be received by the first wireless access point 131 due to degradation of the current wireless communication link 127 between the user equipment 110 and the first wireless access point 131.

In one embodiment, in response to the wireless access point 131 receiving the handoff attempt message (such as indicating the attempted handoff, identity of the wireless access point 132 selected as receiving the handoff, etc.) over the pre-allocated control/communication channel from the user equipment 110, the first wireless access point 131 (or other notified resources) performs any suitable functions or no function at all. For example, in one embodiment, the first wireless access point 131 may not perform any function as a result of receiving the handoff notification message via communications 245. Alternatively, because the handoff attempt message (communications 245) indicates selection of the wireless access point 132, the first wireless access point 131 can be configured to instruct one or more other wireless access points such as wireless access point 133 in the set to revoke or deallocate any resources reserved for the possible handoff associated with the user equipment. This frees up wireless resources for use by other entities.

Thus, embodiments herein include the first wireless access point 131 receiving a communication 245 from the user equipment 110 regarding the handoff attempt. The communication 245 indicates initiation by the user equipment 110 of the conditional handoff of the wireless communication link 127 from the first wireless access point 131 to the second wireless access point 132 (which was selected from the pool of candidate wireless access points).

Further embodiments herein include the user equipment 110 communicating selection of the second wireless access point 132 as a handoff recipient associated with the conditional handoff. For example, via communications 250, in response to detecting the trigger conditions via function 243, the user equipment 110 additionally communicates a handoff request (communications 250) to the selected wireless access point 132.

Accordingly, embodiments herein include user equipment 110 operable to: i) receive notification (via communications 235) of a pool of candidate wireless access points; ii) monitor (via monitor function 243) for occurrence of one or more trigger conditions as specified by the first wireless access point 131 or other suitable resource; and iii) based on a detected trigger condition to execute the conditional handoff, initiate selection (via monitor function 243) of a corresponding wireless access point (such as wireless access point 132) in which to perform a respective handoff.

Via yet further communications 255, the user equipment 110 and wireless access point 132 set up a new wireless communication link 127 between the user equipment 110 and the wireless access point 132 to support the handoff.

Subsequent to setting up and completing the handoff of the user equipment 110 and corresponding wireless communication link 127 from the first wireless access point 110 to the second wireless access point 131, the second wireless access point 132 (receiving the handed off wireless communication link 127) communicates a handoff completion notification message (such as communications 260) indicating the completion of the handoff to the first wireless access point 131. Accordingly, in one embodiment, the first wireless access point 131 is notified of the handoff via the wireless access point 132 accepting the handoff.

As further shown, via communications 265 between the user equipment 110 and the wireless access point 132, the user equipment and corresponding user are provided continued data access services to the remote network 190 and server resources.

Figure 3:
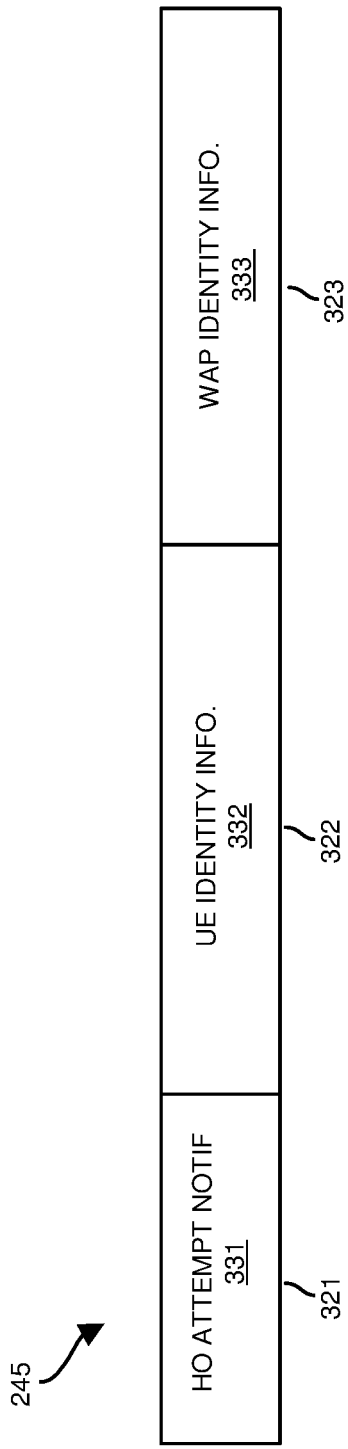
FIG. 3 is an example diagram illustrating contents of a handoff attempt notification according to embodiments herein.

FIG. 3 is an example diagram illustrating a handoff attempt notification according to embodiments herein.

In one embodiment, the message 245 is a best efforts or one-shot message communicated over a temporary allocated control/communication channel. In other words, because the user equipment 110 intends to perform a handoff (such as to wireless access point 132) and discontinue connectivity with the wireless access point 131, there is no need for the user equipment 110 to know for certainty that the message 245 is received by the wireless access point 131.

As previously discussed, the message 245 can include any suitable information. For example, in one embodiment, the message 245 includes: i) first data (such as a handoff attempt notification 331 including one or more bits of data) in data field 321 indicating the initiation of the handoff by the user equipment 110, ii) second data in data field 322, the second data including user equipment identity information 332 specifying an identity of the user equipment 110 initiating the handoff, and iii) third data in data field 323, the third data including wireless access point identity information 333 specifying an identity of the second wireless access point 132 (which was selected by the user equipment 110 to receive the handoff of the wireless communication link 127).

Accordingly, via message 245, if received by the first wireless access point 131, the first wireless access point 131 (source cell) is made aware of the attempted handoff by the user equipment 110 as well as an identity of the user equipment 110 initiating the handoff and an identity of a respective wireless access point 132 intended as a recipient of the handed off wireless communication link 127.

Figure 4:
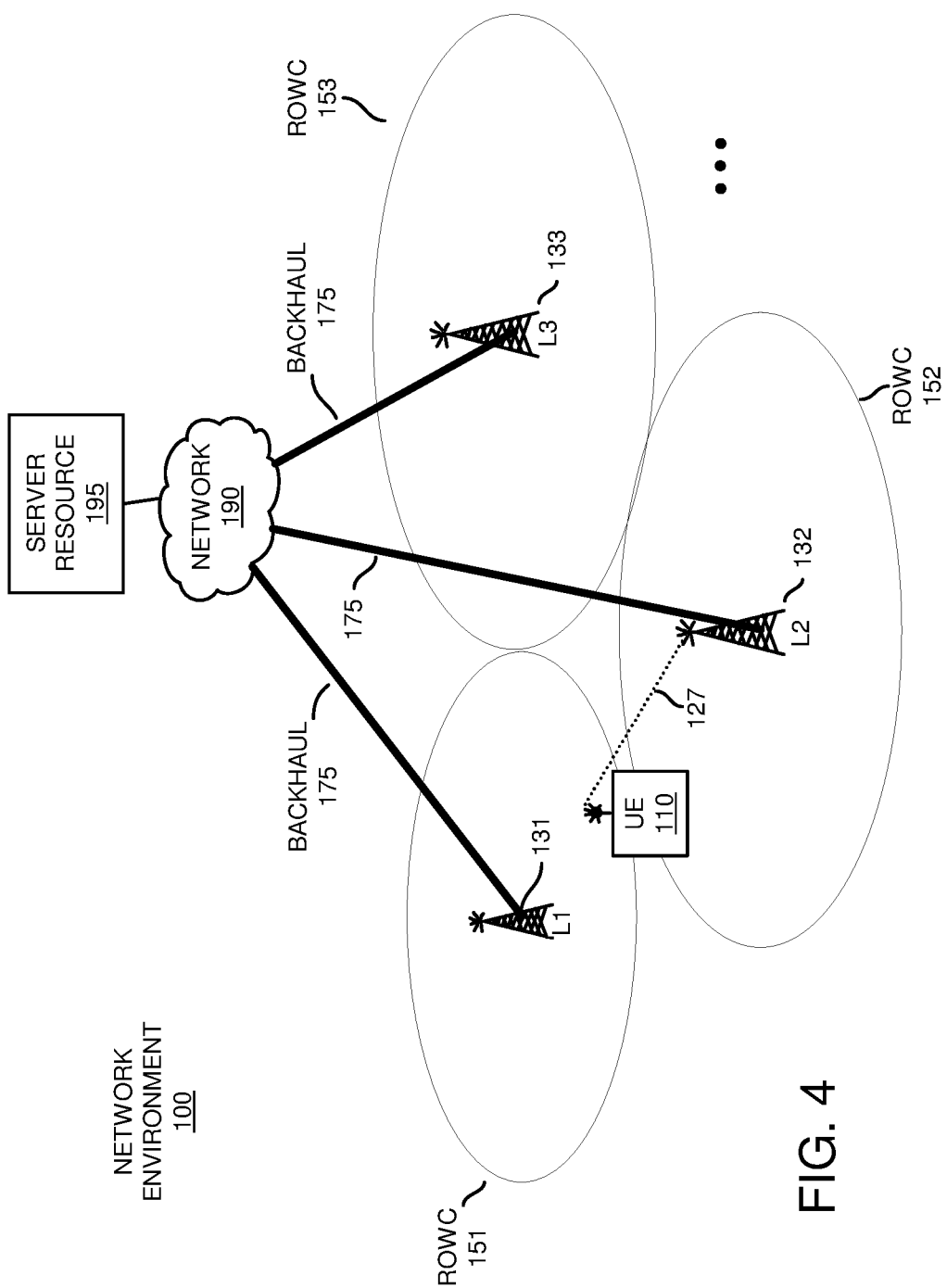
FIG. 4 is an example diagram illustrating completion of a handoff from a first wireless access point to a second wireless access point according to embodiments herein.

FIG. 4 is an example diagram illustrating completion of a handoff from a first wireless access point to a second wireless access point according to embodiments herein.

Via communications 265 over wireless communication link 127 between the user equipment 110 and the wireless access point 132 at location L2, as well as backhaul link 175 between the wireless access point 132 and the network 190, the user equipment 110 accesses one or more server resources (such as server resource 195) in network 190. In a reverse direction, any of the server resources in network 190 are able to communicate over backhaul 175, wireless access point 132, and a respective wireless communication link 127 to the user equipment 110.

Figure 5:
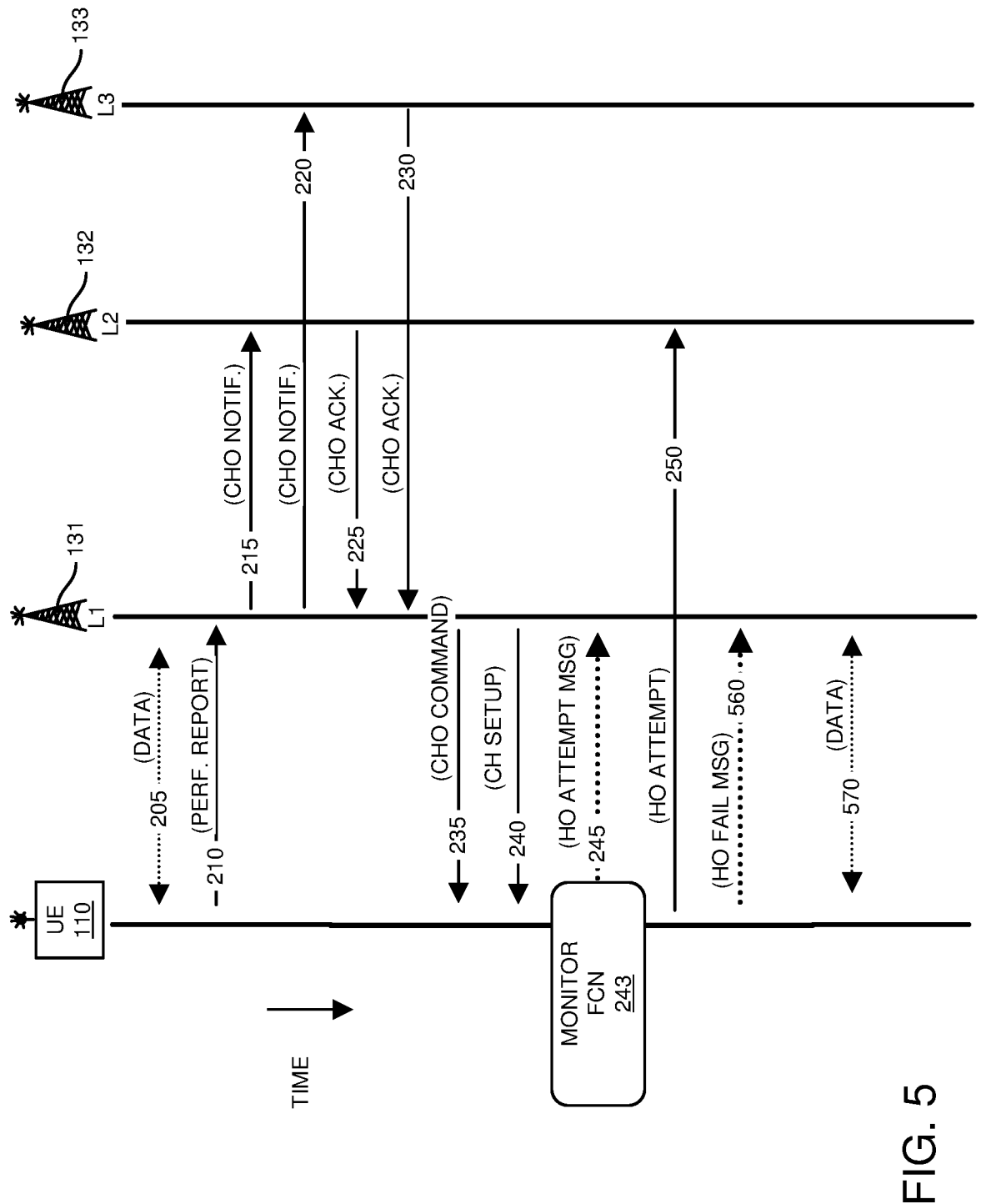
FIG. 5 is an example diagram illustrating handoff control flow according to embodiments herein.

FIG. 5 is an example diagram illustrating a handoff attempt notification according to embodiments herein.

Note that the flow control associated with the attempted handoff in FIG. 5 is similar to the flow in FIG. 2. For example, the user equipment 110 detects a trigger condition and initiates a wireless handoff to the second wireless access point 132 in a manner as previously discussed. However, in this example embodiment, after sending the handoff attempt message (such as via communications 250) indicating attempted handoff of the user equipment 110 and corresponding wireless communication link 127 (such as via communications 250) to the second wireless access point 132, assume that the handoff attempt fails. The failure of the attempted handoff can occur for any reason such as that: i) the second wireless access point 132 is no longer operable, ii) the user equipment 110 moves outside the region of wireless coverage 152, etc.

In such an instance, in response to the failed handoff, the user equipment 110 generates a respective message (via communications 560) to the first wireless access point 131 indicating a failure of the attempted handoff of the user equipment 110 and corresponding wireless communication link 127 from the first wireless access point 131 to the second wireless access point 132.

Figure 6:
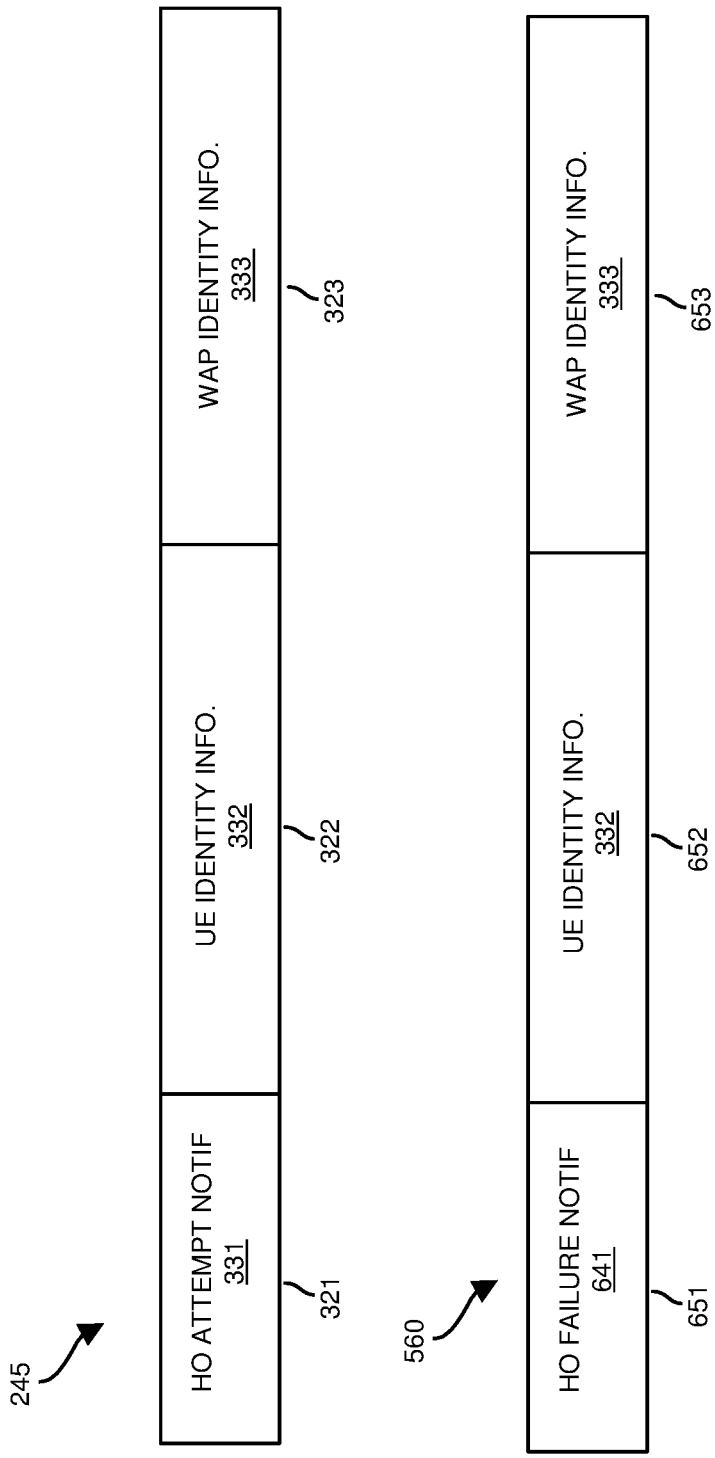
FIG. 6 is an example diagram illustrating a handoff attempt notification and handoff failure notification according to embodiments herein.

FIG. 6 is an example diagram illustrating a handoff attempt notification and handoff failure notification according to embodiments herein.

In one embodiment, as previously discussed, the message 245 is a best efforts message indicating the attempted handoff by the user equipment can include any suitable type of information. In other words, because the user equipment 110 intends to perform a handoff and the wireless communications with the wireless access point 131, there is no need to know for certainty that the message 245 is received by the wireless access point 131.

As previously discussed, the message 245 can include any suitable information. For example, in one embodiment, the message 245 includes: i) first data (such as a handoff attempt notification 331 including one or more bits of data) in data field 321 indicating the initiation of the handoff by the user equipment 110, ii) second data in data field 322, the second data including user equipment identity information 332 specifying an identity of the user equipment 110 initiating the handoff, and iii) third data in data field 323, the third data including wireless access point identity information 333 specifying an identity of the second wireless access point 132 (which was selected by the user equipment 110 to receive the handoff of the wireless communication link 127).

Accordingly, via message 245, the first wireless access point 131 (so-called source or current cell station) is made aware of the attempted handoff by the user equipment 110 as well as an identity of the user equipment 110 initiating the handoff and an identity of a respective wireless access point 132 intended as a recipient of the handed off wireless communication link 127.

In one embodiment, in a similar manner as previously discussed, the message 560 (indicating a failed attempt of the handoff) is a best efforts or one-shot message indicating the failed attempted handoff by the user equipment 110.

As previously discussed, the user equipment 110 sends a handoff failure message if the attempted handoff fails. The handoff failure notification message (such communications 560) can include any suitable information. For example, in one embodiment, the message includes: i) first data (such as a handoff failure notification 641 including one or more bits of data) in data field 651 indicating the initiation of the handoff by the user equipment 110, ii) second data in data field 652, the second data including user equipment identity information 332 specifying an identity of the user equipment 110 that initiated the handoff. If desired, the handoff failure notification can further include third data in data field 653, the third data including wireless access point identity information 343 specifying an identity of the second wireless access point 132 (which was selected by the user equipment 110 to receive the handoff of the wireless communication link 127).

Accordingly, via message 245, the first wireless access point 131 (source cell station) is made aware of the attempted handoff by the user equipment 110 as well as an identity of the user equipment 110 initiating the handoff and an identity of a respective wireless access point 132 intended as a recipient of the handed of the wireless communication link 127.

Via subsequent transmitted message 560, the first wireless access point 131 (source cell station) is made aware of the failed handoff attempt by the user equipment 110 as well as an identity of the user equipment 110 initiating the handoff and an identity of a respective wireless access point 132 intended as a recipient of the handed of the wireless communication link 127.

Accordingly, embodiments herein can include: establishing a temporary control channel between the user equipment 110 and the first wireless access point 131 prior to detecting the trigger condition, the control channel established in anticipation of a possible handoff of the user equipment 110 from the first wireless access point 131 to a second wireless access point 132; and communicating a first message (handoff attempt message via communications 245) from the user equipment 110 to the first wireless access point 131, the first message indicating initiation of the handoff by the user equipment 110 from the first wireless access point 131 to the second wireless access point 132. If the attempted handoff of the user equipment 110 to the second wireless access point 132 fails, the user equipment 110 communicates a second message (such as handoff fail message via communications 560) from the user equipment 110 to the first wireless access point 131. As its name suggests, the handoff fail message indicates a failure of the attempted handoff of the user equipment 110 from the first wireless access point 131 to the second wireless access point 132.

Figure 7:
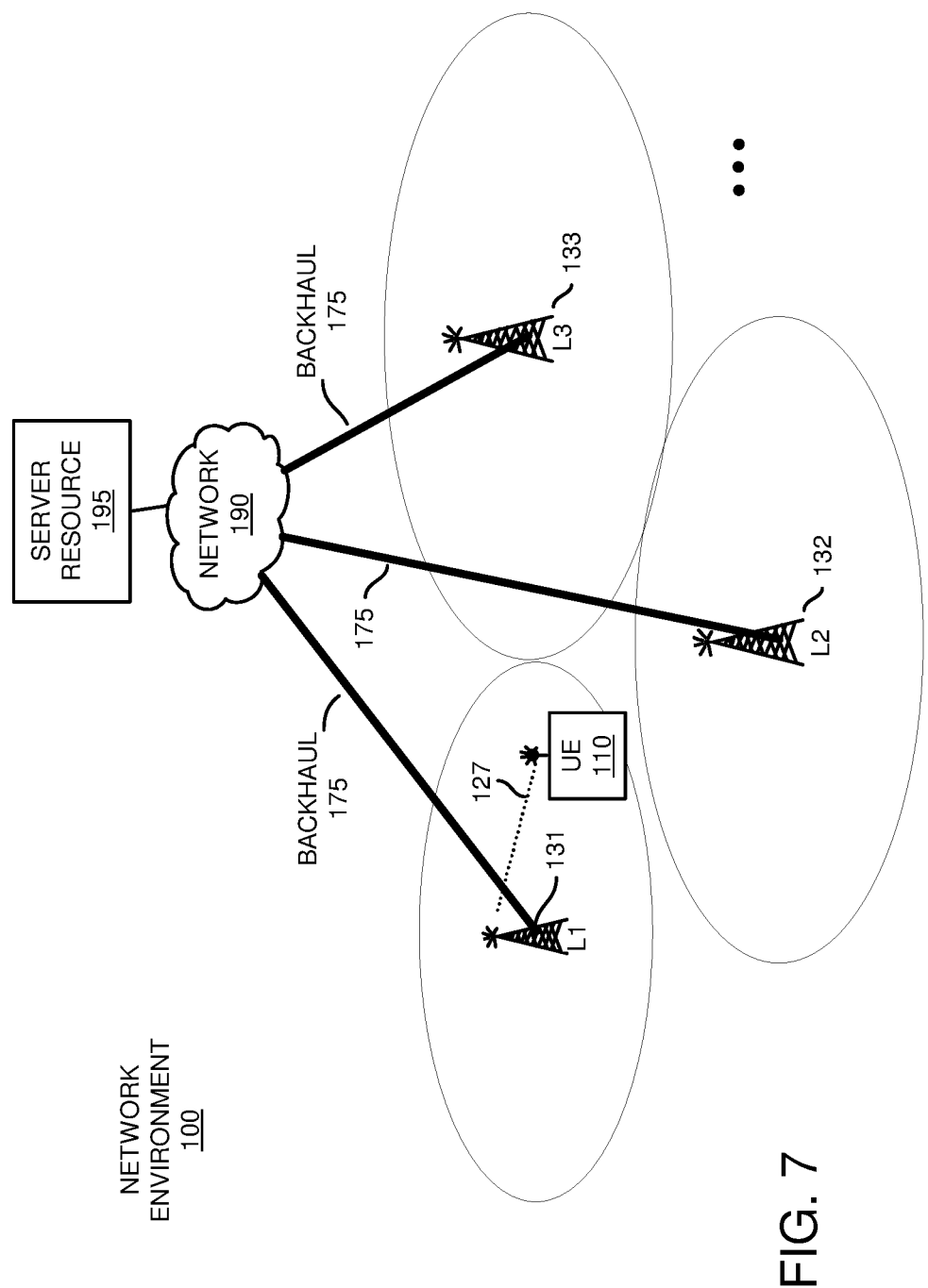
FIG. 7 is an example diagram illustrating failure of a handoff from a first wireless access point to a second wireless access point and continued connectivity to a first wireless access point according to embodiments herein.

FIG. 7 is an example diagram illustrating failure of a handoff from a first wireless access point to a second wireless access point and continued connectivity to a first wireless access point according to embodiments herein.

As further shown in FIG. 7, assume that the wireless access point 131 has not yet deallocated resources associated with the prior wireless communication link 127. In such an instance, the user equipment 110 continues to use the wireless communication link 127 to access network 190 and corresponding one or more server resources. Alternatively, note that if the wireless access point 131 is unavailable after the attempted handoff, the user equipment 110 can be configured to communicate with any other wireless access point in the wireless network environment 100 to establish a respective wireless communication link and access the network 190 again.

Figure 8:
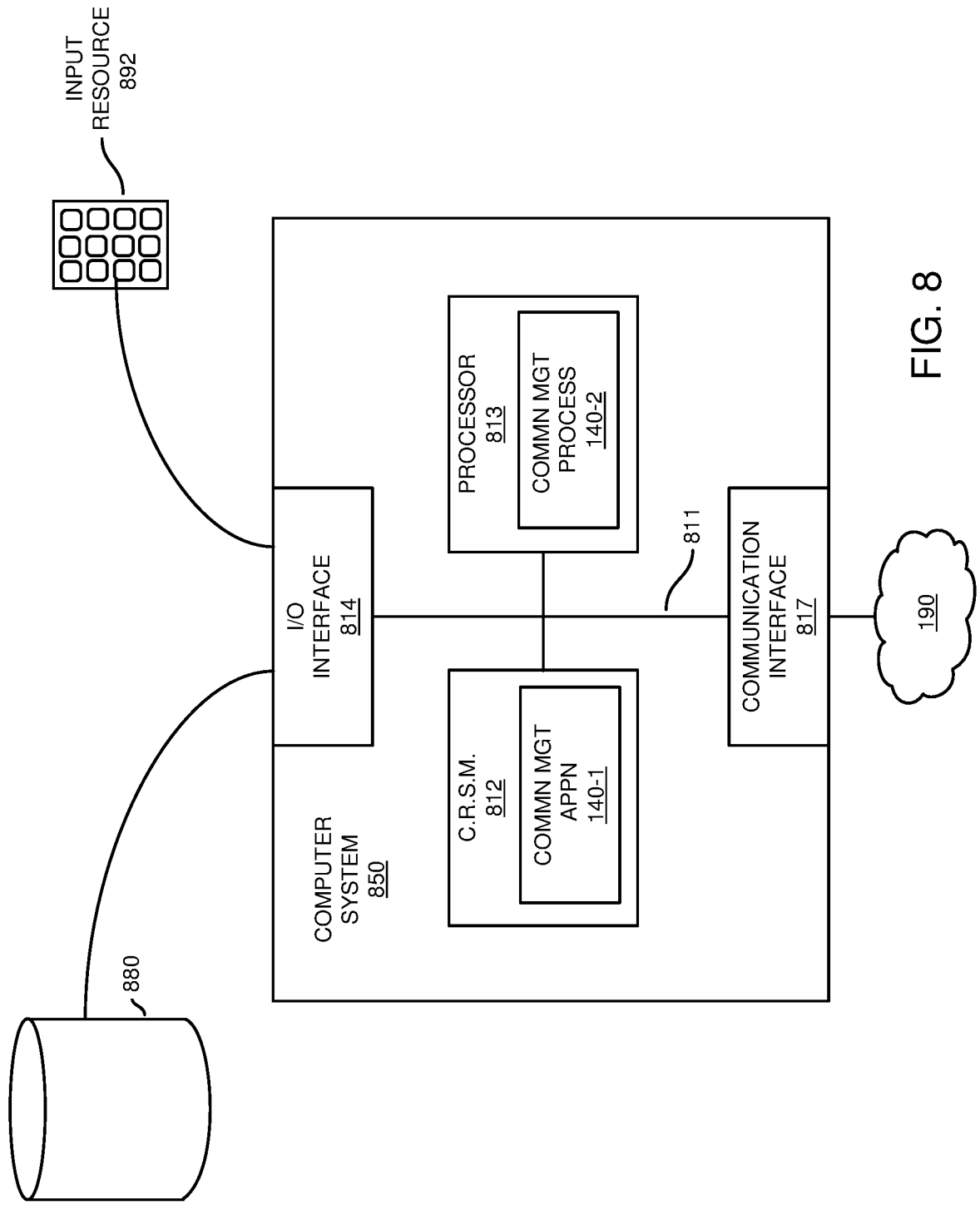
FIG. 8 is an example diagram illustrating example computer hardware and software operable to execute one or more functions (methods) according to embodiments herein.

FIG. 8 is an example block diagram of a computer system for implementing any of the operations as previously discussed according to embodiments herein.

Any of the resources (such as communication manager 140, communication manager 141, user equipment 160, wireless base station 160, etc.) as discussed herein can be configured to include computer processor hardware and/or corresponding executable instructions to carry out the different operations as discussed herein.

As shown, computer system 850 of the present example includes interconnect 811 coupling computer readable storage media 812 such as a non-transitory type of media (which can be any suitable type of hardware storage medium in which digital information can be stored and or retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with communication management application 140-1 (e.g., including instructions) in a respective wireless access point, user equipment, management resource, etc., to carry out any of the operations as discussed herein.

During operation of one embodiment, processor 813 accesses computer readable storage media 812 via the use of interconnect 811 in order to launch, run, execute, interpret or otherwise perform the instructions in communication management application 140-1 stored on computer readable storage medium 812. Execution of the communication management application 140-1 produces communication management process 140-2 to carry out any of the operations and/or processes as discussed herein.

Those skilled in the art will understand that the computer system 850 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, wireless access point, user equipment, wireless station, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9 and 10. Note that the steps in the flowcharts below can be executed in any suitable order.

Figure 9:
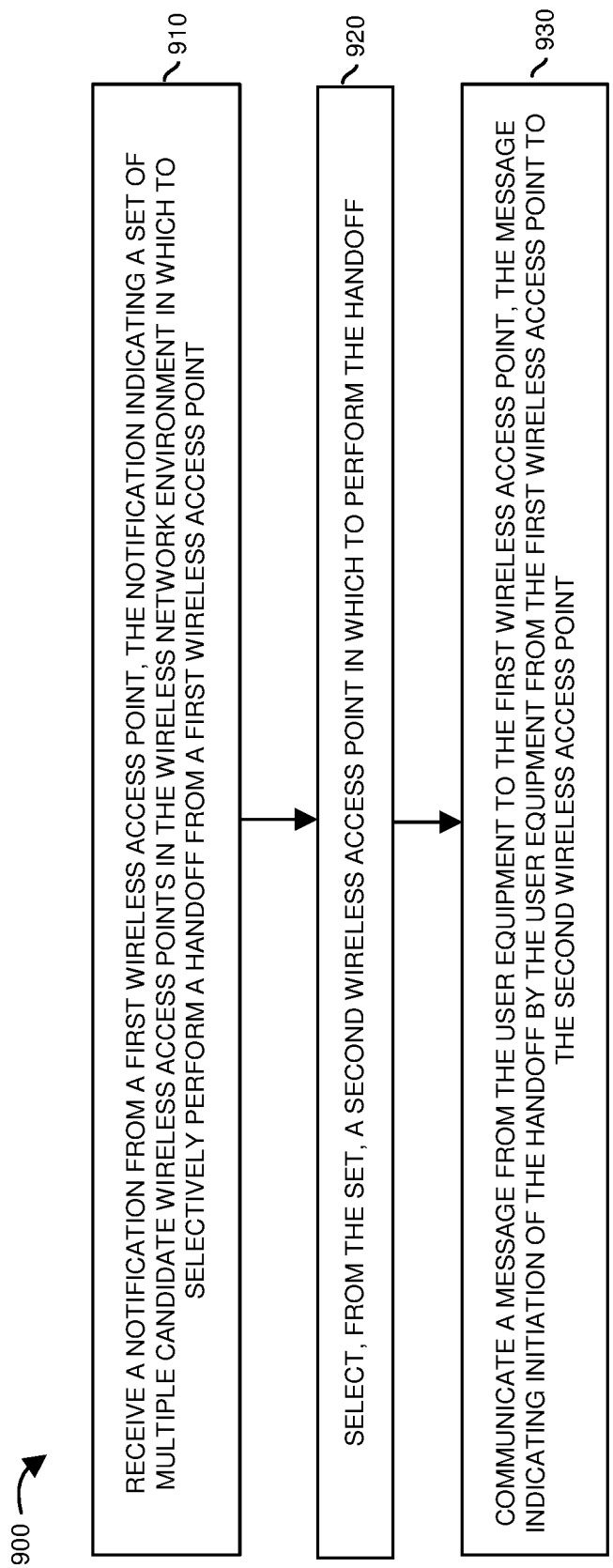
FIG. 9 is an example diagram illustrating a method according to embodiments herein.

FIG. 9 is a flowchart 900 illustrating an example method according to embodiments herein. Note that there will be some overlap with respect to concepts as discussed above.

In processing operation 910, the user equipment 110 receives a notification from a first wireless access point 131, the notification indicating a set of multiple candidate wireless access points in the wireless network environment 100 in which to selectively perform a handoff from a first wireless access point 131.

In processing operation 920, the user equipment 110 selects, from the set, a second wireless access point 132 in which to perform the handoff.

In processing operation 930, the user equipment 110 communicates a message from the user equipment 110 to the first wireless access point 131. The message indicates initiation of the handoff by the user equipment 110 from the first wireless access point 131 to the second wireless access point 132.

Figure 10:
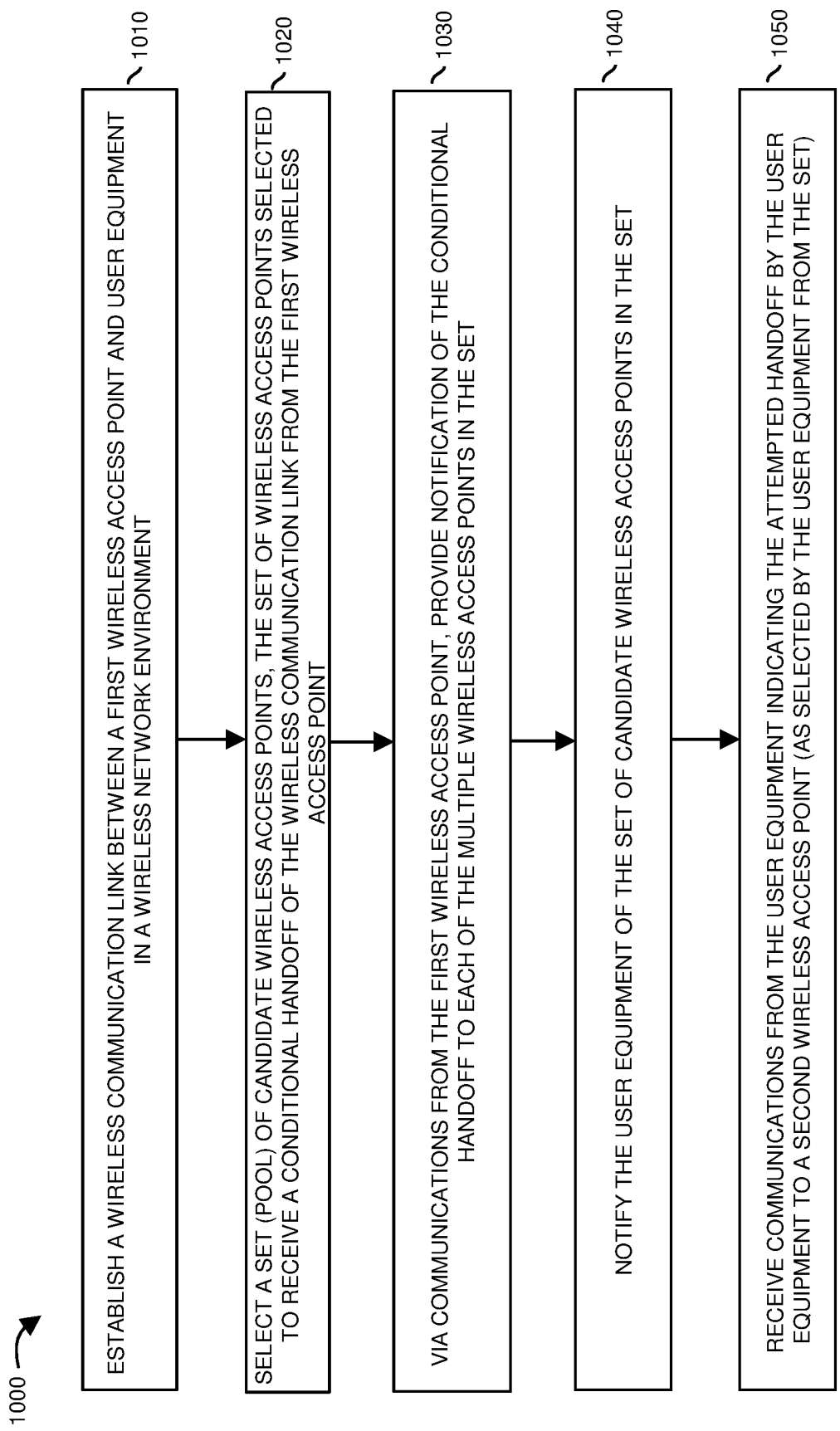
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, the communication management resource associated with wireless access point 131 establishes a wireless communication link 127 between the first wireless access point 131 and user equipment 110 in a wireless network environment 100.

In processing operation 1020, the communication management resource associated with wireless access point 131 selects a set (pool) of candidate wireless access points. The set of wireless access points selected to receive a conditional handoff of the wireless communication link from the first wireless access point 131.

In processing operation 1030, via communications 215, 220, etc., from the first wireless access point 131 to wireless access point 132, 133, etc., the first wireless access point 131 provides notification of the conditional handoff (associated with wireless communication link 127) to each of the multiple wireless access points 132, 133, etc., in the set.

In processing operation 1040, the wireless access point 131 notifies the user equipment 110 of the set of candidate wireless access points 132, 133, etc., in the set.

In processing operation 1050, the wireless access point 131 receives communications 245 from the user equipment 110 indicating the attempted handoff by the user equipment 110 to a second wireless access point (as selected by the user equipment 110 from the set).

As previously discussed, embodiments herein are useful over conventional techniques. For example, the user equipment 110 makes a decision regarding whether to perform a respective conditional handoff, reducing involvement of a current wireless access point 131 from which the handoff occurs. This is significant because, in many instances, a handoff is performed from a current wireless access point 131 to a new wireless access point (such as 132) as a result of a poor wireless connection between the user equipment 110 and current wireless access point 131. Such a poor connection (resulting less reliable communications/dropped data packets) is not conducive for the current wireless access point 131 to facilitate and/or manage the respective handoff. Additionally, allocation of a (temporary) control channel to the user equipment (for corresponding best efforts communication from the user equipment to the current wireless access point over the allocated control channel) potentially provides notice to the current wireless access point of the handoff initiated by the user equipment. Yet further, as previously discussed, the control channel also can be used to provide notification from the user equipment 110 to the current wireless access point 131 of any failed attempts.

FURTHER EMBODIMENTS

Further embodiments herein, and embodiments as previously discussed, solve two problems associated with Conditional Handover (CHO) feature associated with 3GPP's RAN2 (with support from RAN1, RAN3, and RAN4 WGs).
How to indicate a light-touch "I am departing message" from UE to source cell?
How to indicate a light-touch "I tried departing but failed message" from UE to source cell?

With reference to prior FIGS., as previously discussed, when a triggering condition occurs such as detected by the user equipment 110), the UE executes Conditional Handover (CHO) per prior-instruction from the source node (such as wireless access point 131).

Unlike conventional handoffs, the current source node (such as wireless access point 131 in the above example) is not expected to be aware of the exact time instance "when" UE 110 will attempt access to one of the candidate target cells (such as selected wireless access point 132) provided in a pool of candidate wireless access points by the source node (wireless access point 131). This is understandable given that UE's source cell conditions are expected to deteriorate rapidly.

In certain instances, as previously discussed, it may be beneficial to provide notification (such as via communications 245) of a respective handoff attempt from the user equipment 110 to the first wireless access point 131 via L1 and HARQ communications, however, this may require re-transmission of messages. However, if PHY and HARQ-based overhead communications can be avoided, as discussed above, then a one-shot fire-and-forget (such as a layer 1 message, or message at the physical layer) PHY-based message (such as communications 245 or handoff attempt message) may be useful to at least notify the respective wireless access point 131 of the attempted handoff and/or occurrence of the trigger condition.

In one embodiment, the temporary control/communication channel set up for handoff communications 245, 560, etc., is a Physical Uplink Control Channel (PUCCH) for the "bye" message (handoff attempt message or communications 245). PUCCH is nominally used to transmit uplink control information having an RRC-based confirmation or "bye" msg from the user equipment 110, the source node (wireless access point 131) may not always be (UCI) such as HARQ ACK/NACK when configured/triggered to do so by a respective gNB.

In accordance with further embodiments, via communications 245, the user equipment 110 sends an L1-based (Layer 1 based) "bye" message using an existing PUCCH message format. Specifically, in one embodiment, the UE is configured with a PUCCH resource that is to be used for the L1-based "bye" message (communication 245). Note that, in the seven-layer OSI model of computer networking, the physical layer or layer 1 is the first and lowest layer. This layer may be implemented by a PHY chip. In general, the physical layer defines the means of transmitting raw bits rather than logical data packets over a physical data link connecting network nodes.

In one embodiment, the PUCCH resource configuration in which to communicate the handoff attempt message (245) or the handoff failure message (560) includes a slot, PRB location, frequency hopping configuration, PUCCH format, message content, and potentially multiplexing information (e.g., cyclic shifts or orthogonal spreading codes, if applicable in the case of multi-user multiplexing for the "bye" message on the same PUCCH resource).

In one embodiment, the message content associated with communication 245 includes:
"Bye" (1-bit or multiple bits) such as handoff attempt notification 631
If the PUCCH resource (such as communication channel) is allocated only for a particular UE, then the UE-identity of the user equipment performing the handoff is not required to be sent explicitly and a 1-bit msg is sufficient for the "bye" msg.
If the PUCCH resource is shared, the configured per-UE cyclic shift or orthogonal cover code allows the gNB to recover the transmission of an individual UE.
If
Bit set to 0: Indicates "failed bye" such as handoff failure notification 641
Bit set to 1: Indicated "bye" such as handoff attempt notification 331
UE-Identity (e.g., 4-bit) such as user equipment identity information 632, 642:
In one embodiment, since PUCCH (temporary pre-allocated channel) may be a shared resource, the source node (wireless access point 131) may need an additional confirmation in a received message 245 in order to identify which UE sent this "bye" msg. To get around this issue, in one embodiment,
    the source node (wireless access point 131) sends the UE 110 a 4-bit bitmap which it maps to C-RNTI (16-bits) of UE whilst in RRC_CONNECTED mode.
    the user equipment 110 can be configured to include this 4-bit bitmap information in its L1-based CHO "bye" msg on PUCCH.
    In one embodiment, inclusion of the UE-identity should be taken as implicit "bye". No extra bit(s) are needed. Further embodiments herein can include specifying the Target Cell's PCI (10-bits of information).
Target PCI: PCI of Candidate target cell to which this UE is handing off to.
    NR PCI is represented using 10-bits
    EUTRAN PCI is represented using 9-bits. So, a 10-bit value in a can also cover candidate EUTRAN target handoff cells as well.
The PUCCH format to be used is a function of the message content payload size. For example, PUCCH format 4 can be used for several of the above payloads (4 bits, 14 bits, 10 bits, etc.) and also support multi-user multiplexing if needed. PUCCH Format 0 or 1 may be used for a 1-bit "bye" msg.
Upon receipt of L1 "bye" message, source eNB (from which handoff occurs such as wireless access point 131):
    identifies whether shared or dedicated PUCCH resource is used.
    In a manner as previously discussed, the wireless access point 131 decodes the "bye" bit, checks for inclusion of UE-Identity, and Target PCI.
Behavior of wireless access point 131 based on message 245:
    If "bye" bit==1 (communication 245 indicates a failed handoff attempt), then based on implementation, the wireless access point 131 can perform any suitable operations such as:
    Start context cleanup for this UE in self AND
        i) decide to instruct all target cell(s) to revoke resources reserved wireless resources for this UE, OR
        ii) decide to instruct all target cell(s) (such as wireless access point 133, etc.) except target cell (wireless access point 132) indicated by Target PCI (if included) to revoke resources reserved for this UE OR
        iii) not take any action towards target cell(s) unless a new L1 "bye" message with "bye" bit set to 0 (in other words, a handoff failure notification 641) is received
OR
    i)—No context cleanup for this UE in self AND (same options as above)
OR
    Do nothing
If "bye" bit==0 (in other words, a handoff failure attempt message is received), then based on implementation, the wireless access point 131 can be configured to:
Check if for the same UE, L1 "bye" msg with "bye" bit set to 1 was received previously.

i) If yes, then switch to legacy (LTE or NR) HO behavior (per TS 36.300, TS 36.331 etc for LTE and TS 38.300, TS 38.331 etc for NR) AND
    ii) If context cleanup operation not already performed upon receipt of L1 "bye" message w/ "bye" bit set to 1, then execute actions defined for when "bye" bit set to 1 is received (per above)

Thus, if the user equipment 110 indicates a handoff attempt via communications 245, the wireless access point 131 (such as eNB) may decide to instruct target cell(s) to revoke resources reserved for this USER EQUIPMENT. If UE sent the target PCI to source eNB in light-touch L1 CHO "bye" message, then the source eNB can chose to not revoke reserved resources on the target cell indicated by the USER EQUIPMENT. UE's RACH attempt at target cell (t #1) fails. UE selects another CHO candidate cell (t #2) matching the triggering criteria. However, due to /2/, such as reserved CHO resources on t #2 may already have been deleted by t #2. Note, RACH re-attempt timelines are much shorter than X2/Xn timelines. However, this case is presented as an exaggeration to highlight the consequences of early reserved resource removals Observation 1: Link conditions notwithstanding, it is possible for the source cell to send legacy HO command to UE which has triggered CHO and is the process of executing the triggered CHO.

Observation 2: Link conditions and capabilities notwithstanding, based on observation #1 it is also possible for the UE to send L3 (RRC) signaling messages to source cell while UE is in the process of executing the triggered CHO.

Observation 3: The sooner the source eNB can release unutilized resources across target cell(s) the better the expected system performance and utilization.

Conclusion/Solution 1: Embodiments herein define an optional Condition Handover "Bye" procedure between UE and source eNB with the following characteristics:
    It is a L1-only message sent without any retransmissions (best efforts, one shot, single transmission, etc.)
    It is triggered by the UE when a CHO triggering criterion has been satisfied (i.e. a triggering condition evaluates to true)
    Upon sending of which, UE executes CHO procedures with target node
    Note, this mechanism is assumed to be in addition to current HO behavior wherein upon successful completion of RACH procedure on target cell the target cell will inform the source cell of the CHO completion (details are FFS and for RAN3 to decide).

Conclusion/Solution 2: The wireless access point 131 (such as eNB) behavior upon receipt of light-weight L1 CHO bye message (communication 245) can be implementation dependent. Actions include, e.g., source eNB starting cleanup of reserved resources on other target cell(s).

Note again that techniques herein are well suited to facilitate use of a shared wireless channel amongst different types of wireless stations. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at user equipment in a wireless network environment:
   receiving a notification from a first wireless access point, the notification indicating a set of multiple candidate wireless access points in the wireless network environment in which to selectively perform a handoff from the first wireless access point;
   selecting, from the set, a second wireless access point in which to perform the handoff;
   establishing a temporary communication channel between the user equipment and the first wireless access point, the temporary communication channel dedicated to convey handoff communications; and
   communicating a message from the user equipment to the first wireless access point over the temporary communication channel, the message indicating initiation of the handoff by the user equipment from the first wireless access point to the second wireless access point.

2. The method as in claim 1, wherein the notification from the first wireless access point to the user equipment further specifies a handoff trigger condition, which is monitored by the user equipment in response to receiving the notification.

3. The method as in claim 1 further comprising:
   prior to receiving the notification at the user equipment from the first wireless access point:
   i) via the user equipment, monitoring for presence of wireless access points other than the first wireless access point in the wireless network environment; and
   ii) communicating a report from the user equipment to the first wireless access point, the report including performance information associated with a group of wireless access points detected as being in wireless communication range of the user equipment, the set of multiple wireless access points being selected from the group based on the performance information.

4. The method as in claim 1, wherein a communication management resource associated with the first wireless access point produces the set of multiple candidate wireless access points based at least in part on performance information received from the user equipment.

5. The method as in claim 1, wherein the message is a first message;
   wherein the temporary communication channel is dedicated to convey handoff communications from the user equipment to the first wireless access point, the method further comprising:
   in response to completion of the handoff of the user equipment from the first wireless access point to the second wireless access point, communicating a second message from the second wireless access point to the first wireless access point, the second message indicating the completion of the handoff.

6. The method as in claim 1 further comprising:
   via communications from the user equipment to the second wireless access point, initiating the handoff of the user equipment to the second wireless access point.

7. The method as in claim 1, wherein the message includes:
   i) first data indicating the initiation of the handoff by the user equipment,
   ii) second data indicating an identity of the user equipment, and
   iii) third data indicating an identity of the second wireless access point.

8. The method as in claim 1, wherein the message is a first message, the method further comprising:
   communicating a second message from the user equipment over the temporary communication channel to the first wireless access point, the second message indicating a failure of the handoff of the user equipment from the first wireless access point to the second wireless access point.

9. The method as in claim 8 further comprising:
   establishing the temporary communication channel between the user equipment and the first wireless access point prior to detecting a trigger condition indicating to initiate the handoff, the temporary communication channel established in anticipation of the handoff of the user equipment from the first wireless access point to a wireless access point in the set;
   wherein communicating the first message includes: communicating the first message over the temporary communication channel from the user equipment to the first wireless access point; and wherein communicating the second message includes:
communicating the second message over the temporary communication channel from the user equipment to the first wireless access point.

10. The method as in claim 1, wherein the message is not retransmitted over the temporary communication channel from the user equipment to the first wireless access point.

11. The method as in claim 10, wherein the message includes a single bit indicating a status of executing the handoff by the user equipment.

12. The method as in claim 10, wherein setting of a single bit to a first state indicates an attempted handoff of the user equipment from the first wireless access point to the second wireless access point; and
wherein setting of the single bit to a second state indicates a failed handoff of the user equipment from the first wireless access point to the second wireless access point.

13. The method as in claim 1 further comprising:
via the user equipment, communicating the message over the temporary communication channel to the first wireless access point in response to a decision by the user equipment to initiate the handoff to the second wireless access point.

14. The method as in claim 1, wherein the temporary communication channel is established solely for use by the user equipment to convey uplink handoff communications from the user equipment to the first wireless access point.

15. The method as in claim 1, wherein the temporary communication channel is a physical uplink control channel established between the user equipment and the first wireless access point.

16. The method as in claim 1, wherein the temporary communication channel is shared by multiple communication devices to communicate with the first wireless access point; and
wherein the message from the user equipment over the temporary communication channel is orthogonally coded, enabling detection that the message was sent by the user equipment to the first wireless access point.

17. The method as in claim 1 further comprising:
at the user equipment:
receiving a bitmap from the first wireless access point; and
including the bitmap in the message communicated from the user equipment over the temporary communication channel to the first wireless access point.

18. The method as in claim 1, wherein the set of wireless access points includes an identity of a third wireless access point; and
wherein the first wireless access point is operative to communicate a handoff completion notification associated with the handoff to the third wireless access point, the handoff completion notification prompting the third wireless access point to deallocate resources associated with the handoff.

19. The method as in claim 1, wherein the temporary communication channel is allocated in case a trigger condition occurs causing the user equipment to initiate the handoff.

20. The method as in claim 19, wherein the message is a best efforts message indicating an attempt by the user equipment to perform the handoff; and
wherein the first wireless access point does not communicate a reply associated with the message to the user equipment.

21. A system comprising:
user equipment operated in a wireless network environment, the user equipment operable to:
receive a notification from a first wireless access point, the notification indicating a set of multiple candidate wireless access points in the wireless network environment in which to selectively perform a handoff from the first wireless access point;
select, from the set, a second wireless access point in which to perform the handoff;
establish a temporary communication channel between the user equipment and the first wireless access point, the temporary communication channel dedicated to convey handoff communications; and
communicate a message from the user equipment over the temporary communication channel to the first wireless access point, the message indicating initiation of the handoff by the user equipment from the first wireless access point to the second wireless access point.

22. The system as in claim 21, wherein the notification from the first wireless access point to the user equipment further specifies a handoff trigger condition, which is monitored by the user equipment in response to receiving the notification.

23. The system as in claim 21, wherein the user equipment is further operable to:
prior to receiving the notification at the user equipment from the first wireless access point:
i) via the user equipment, monitor for presence of wireless access points other than the first wireless access point in the wireless network environment; and
ii) communicate a report from the user equipment to the first wireless access point, the report including performance information associated with a group of wireless access points detected as being in wireless communication range of the user equipment, the set of multiple wireless access points being selected from the group.

24. The system as in claim 21, wherein a communication management resource associated with the first wireless access point is operable to produce the set of multiple candidate wireless access points based at least in part on performance information received from the user equipment.

25. The system as in claim 21, wherein the message is a first message; and
wherein the second wireless access point is operable to:
in response to completion of the handoff of the user equipment from the first wireless access point to the second wireless access point, communicating a second message from the second wireless access point to the first wireless access point, the second message indicating the completion of the handoff.

26. The system as in claim 21, wherein the user equipment is further operable to:
via communications from the user equipment to the second wireless access point, initiate the handoff of the user equipment to the second wireless access point.

27. The system as in claim 26, wherein the message includes:
i) first data indicating the initiation of the handoff by the user equipment,
ii) second data indicating an identity of the user equipment, and
iii) third data indicating an identity of the second wireless access point.

28. The system as in claim 21, wherein the message is a first message, the user equipment further operable to:
  communicate a second message from the user equipment over the temporary communication channel to the first wireless access point, the message indicating a failure of the handoff of the user equipment from the first wireless access point to the second wireless access point.

29. The method as in claim 28, wherein the user equipment is further operable to:
  establish the temporary communication channel between the user equipment and the first wireless access point prior to detecting a handoff trigger condition, the temporary communication channel established in anticipation of the handoff of the user equipment from the first wireless access point to a wireless access point in the set;
  communicate the first message over the temporary communication channel from the user equipment to the first wireless access point; and
  communicate the second message over the temporary communication channel from the user equipment to the first wireless access point.

30. Computer-readable storage hardware having instructions stored thereon, the instructions, when carried out by computer processor hardware, cause the computer processor hardware to:
  receive a notification from a first wireless access point, the notification indicating a set of multiple candidate wireless access points in the wireless network environment in which to selectively perform a handoff from the first wireless access point;
  select, from the set, a second wireless access point in which to perform the handoff;
  establish a temporary communication channel between the user equipment and the first wireless access point; and
  communicate a message from the user equipment over the temporary communication channel to the first wireless access point, the message indicating initiation of the handoff by the user equipment from the first wireless access point to the second wireless access point.

31. A method comprising:
  selecting a set of candidate wireless access points, the set of wireless access points selected as candidates to receive a conditional handoff of a wireless communication link from a first wireless access point, the wireless communication link established between the first wireless access point and user equipment;
  via communications from the first wireless access point to each of the candidate wireless access points in the set, providing notification of the conditional handoff to each of the wireless access points;
  notifying the user equipment of the set of candidate wireless access points in the set; and
  receiving a communication from the user equipment over a temporary handoff communication channel between the user equipment and the first wireless access point, the communication indicating initiation by the user equipment of the conditional handoff of the wireless communication link from the first wireless access point to a second wireless access point.

32. The method as in claim 31 further comprising:
  via the communications from the first wireless access point to the user equipment, providing notification of a trigger condition in which the user equipment is to initiate execution of the conditional handoff of the wireless communication link from the first wireless access point to a wireless access point selected by the user equipment from the set.

33. The method as in claim 31 further comprising:
  selecting the set of candidate wireless access points based on performance information received at the first wireless access point from the user equipment, the performance information indicating an ability of the user equipment to receive wireless communications from the candidate wireless access points.

34. The method as in claim 31, wherein the set includes an identity of the second wireless access point and an identity of a third wireless access point; and
  wherein providing notification of the conditional handoff to each of the multiple wireless access points in the set includes: i) transmitting a first communication from the first wireless access point to the second wireless access point, the first communication prompting the second wireless access point to reserve wireless resources to associated with the conditional handoff, and ii) transmitting a second communication from the first wireless access point to the third wireless access point, the second communication prompting the third wireless access point to reserve wireless resources associated with the conditional handoff.

* * * * *